(12) United States Patent
Hsu et al.

(10) Patent No.: US 12,132,344 B2
(45) Date of Patent: Oct. 29, 2024

(54) POWER SYSTEM DESIGN AND CONTROL TECHNOLOGY

(71) Applicant: CHUNG-HSIN ELECTRIC & MACHINERY MFG. CORP., Taoyuan (TW)

(72) Inventors: Che-Jung Hsu, Taoyuan (TW); Cheng-Huei Lin, Taoyuan (TW); Yen-Teh Shih, Taoyuan (TW); Yu-Kai Chen, Taoyuan (TW); Min-Min Wu, Taoyuan (TW)

(73) Assignee: CHUNG-HSIN ELECTRIC &MACHINERY MFG. CORP., Taoyuan (TW)

( * ) Notice: Subject to any disclaimer, the term of this patent is extended or adjusted under 35 U.S.C. 154(b) by 15 days.

(21) Appl. No.: 17/945,005

(22) Filed: Sep. 14, 2022

(65) Prior Publication Data
US 2023/0387712 A1 Nov. 30, 2023

(51) Int. Cl.
| | |
|---|---|
| *H02J 7/34* | (2006.01) |
| *H01M 8/04537* | (2016.01) |
| *H01M 10/0525* | (2010.01) |
| *H01M 10/42* | (2006.01) |
| *H01M 10/46* | (2006.01) |
| *H01M 10/48* | (2006.01) |
| *H01M 16/00* | (2006.01) |
| *H02J 7/00* | (2006.01) |

(52) U.S. Cl.
CPC ........... *H02J 7/34* (2013.01); *H01M 8/04552* (2013.01); *H01M 10/0525* (2013.01); *H01M 10/425* (2013.01); *H01M 10/46* (2013.01); *H01M 10/482* (2013.01); *H01M 10/486* (2013.01); *H01M 16/006* (2013.01); *H02J 7/00308* (2020.01); *H02J 7/00309* (2020.01); *H02J 7/0047* (2013.01); *H02J 7/0063* (2013.01); *H02J 7/00714* (2020.01); *H02J 7/007182* (2020.01); *H02J 7/007192* (2020.01); *H02J 2300/30* (2020.01)

(58) Field of Classification Search
CPC ...... H02J 7/34; H02J 7/00308; H02J 7/00309; H02J 7/0047; H02J 7/0063; H02J 7/00714; H02J 7/007182; H02J 7/007192; H02J 2300/30; H01M 8/04552; H01M 10/0525; H01M 10/425; H01M 10/46; H01M 10/482; H01M 10/486; H01M 16/006
USPC .......................................................... 307/66
See application file for complete search history.

(56) References Cited

U.S. PATENT DOCUMENTS

| | | | |
|---|---|---|---|
| 2009/0233127 A1* | 9/2009 | Ohya | ................ H01M 8/04917 429/429 |
| 2012/0283890 A1* | 11/2012 | Fu | ........................... H02J 3/388 700/286 |
| 2016/0159492 A1* | 6/2016 | Filangi, Jr. | .............. B60L 58/40 244/58 |

(Continued)

*Primary Examiner* — Richard Tan

(57) ABSTRACT

An electronic device includes a fuel cell, a first switch, a rechargeable battery, a second switch, and a relay. The fuel cell provides a fuel voltage. The first switch provides the fuel voltage to a first node according to a first control signal. The rechargeable battery provides a battery voltage. The second switch is coupled to the first node and charges the rechargeable battery with the fuel voltage according to a second control signal. The relay provides a voltage of the first node to the load according to the third control signal.

17 Claims, 10 Drawing Sheets

(56) References Cited

U.S. PATENT DOCUMENTS

2018/0145350 A1\* 5/2018 Matsumoto ....... H01M 8/04634
2021/0402939 A1\* 12/2021 Obayashi .............. H02J 7/0063
2023/0057202 A1\* 2/2023 Cirillo ....................... B60L 1/12

\* cited by examiner

POWER SYSTEM DESIGN AND CONTROL TECHNOLOGY

CROSS REFERENCE TO RELATED APPLICATIONS

This application claims priority of Taiwan Patent Application No. 111120232, filed on May 31, 2022, the entirety of which is incorporated by reference herein.

BACKGROUND OF THE INVENTION

Field of the Invention

The disclosure is generally related to an electronic device having a fuel cell and a rechargeable battery.

Description of the Related Art

With the rapid development of alternative energy sources, various new types of battery architectures have been proposed, and fuel cells have received attention again. In order to utilize fuel cells more effectively, it is necessary to optimize the battery pack of the fuel cell, so as to accelerate the marketization of cutting-edge fuel cell technology.

BRIEF SUMMARY OF THE INVENTION

A fuel cell combined with a rechargeable battery is provided herein. The rechargeable battery may make up for the issue of insufficient current driving capability of the fuel cell, and the fuel cell may continuously supplement the power of the rechargeable battery to improve endurance. A protection method and a state-of-charge calculation method are also provided herein, which help to ensure the normal operation of the fuel cell combined with the rechargeable battery and provide the user with reliable information about the power level of the rechargeable battery, so as to improve user experience.

In an embodiment, an electronic device comprises a fuel cell, a first switch, a rechargeable battery, a second switch, and a relay. The fuel cell provides a fuel voltage. The first switch provides the fuel voltage to a first node according to a first control signal. The rechargeable battery provides a battery voltage. The second switch is coupled to the first node and charges the rechargeable battery with the fuel voltage according to a second control signal. The relay provides a voltage of the first node to a load according to a third control signal.

According to an embodiment of the invention, the electronic device further comprises a unidirectional conducting device. The unidirectional conducting device is coupled between the fuel cell and the first switch and configured to unidirectionally provide the fuel voltage to the first switch.

According to an embodiment of the invention, the unidirectional conducting device comprises a diode. The diode comprises an anode and a cathode, in which the anode is coupled to the fuel battery, and the cathode is coupled to the first switch.

According to another embodiment of the invention, the diode is a Schottky diode.

According to an embodiment of the invention, the first switch is a metal oxide semiconductor.

According to another embodiment of the invention, the second switch is an insulated gate bipolar transistor.

According to an embodiment of the invention, the electronic device further comprises a first current detector and a second current detector. The first current detector is coupled between the second switch and the rechargeable battery and configured to detect a battery current of the rechargeable battery to generate a first current signal. The second current detector is coupled between the first node and the relay and configured to detect a load current flowing to the load to generate a second current signal.

According to an embodiment of the invention, each of the first current detector and the second current detector is a Hall detector.

According to an embodiment of the invention, the electronic device further comprises a first voltage detection circuit and a second voltage detection circuit. The first voltage detection circuit is configured to detect the fuel voltage to generate a first voltage detection signal. The second voltage detection circuit is configured to detect the battery voltage to generate a second voltage detection signal.

According to an embodiment of the invention, the electronic device further comprises a driving circuit and a controller. The driving circuit generates the first control signal, the second control signal, and the third control signal according to a driving signal. The controller generates the driving signal according to the first current signal, the second current signal, the first voltage detection signal, and the second voltage detection signal.

According to an embodiment of the invention, the electronic device further comprises a peripheral power supply. The peripheral power supply is configured to power the first voltage detection circuit, the second voltage detection circuit, the first current detector, the second current detector, the driving circuit, and the controller.

According to an embodiment of the invention, the rechargeable battery comprises a multiple of lithium battery cells. The electronic device further comprises a protection circuit. The protection circuit is configured to prevent voltages of the lithium battery cells from exceeding a second threshold voltage.

According to an embodiment of the invention, the protection circuit further comprises a first temperature detection circuit. The first temperature detection circuit is configured to detect a temperature of the first switch to generate a first temperature detection signal. The first temperature detection circuit provides the first temperature detection signal to the controller.

According to an embodiment of the invention, when the controller determines that the temperature of the first switch exceeds a first temperature according to the first temperature detection signal, the driving circuit turns off the first switch, the second switch, and the relay.

According to an embodiment of the invention, the protection circuit further comprises a second temperature detection circuit. The second temperature detection circuit is configured to detect a temperature of the rechargeable battery to generate a second temperature detection signal. The temperature detection circuit provides the second temperature detection signal to the controller.

According to an embodiment of the invention, when the controller determines that the temperature of the rechargeable battery exceeds a second temperature according to the second temperature detection signal, the driving circuit turns off the first switch, the second switch, and the relay.

According to an embodiment of the invention, each of the first temperature detection circuit and the second temperature detection circuit further comprises a negative temperature coefficient resistor, a first resistor, and a first capacitor. The negative temperature coefficient resistor is coupled between a supply voltage and a second node. The first resistor is coupled between the second node and a ground. The first capacitor is coupled between the second node and the ground. The temperature detection signal is generated at the second node.

According to an embodiment of the invention, the peripheral power supply provides the supply voltage.

According to an embodiment of the invention, when the controller determines that the fuel voltage exceeds a first threshold voltage according to the first voltage detection signal, the driving circuit turns off the first switch.

According to an embodiment of the invention, when the controller determines that the battery voltage exceeds a second threshold voltage according to the second voltage detection signal, the driving circuit turns off the second switch.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
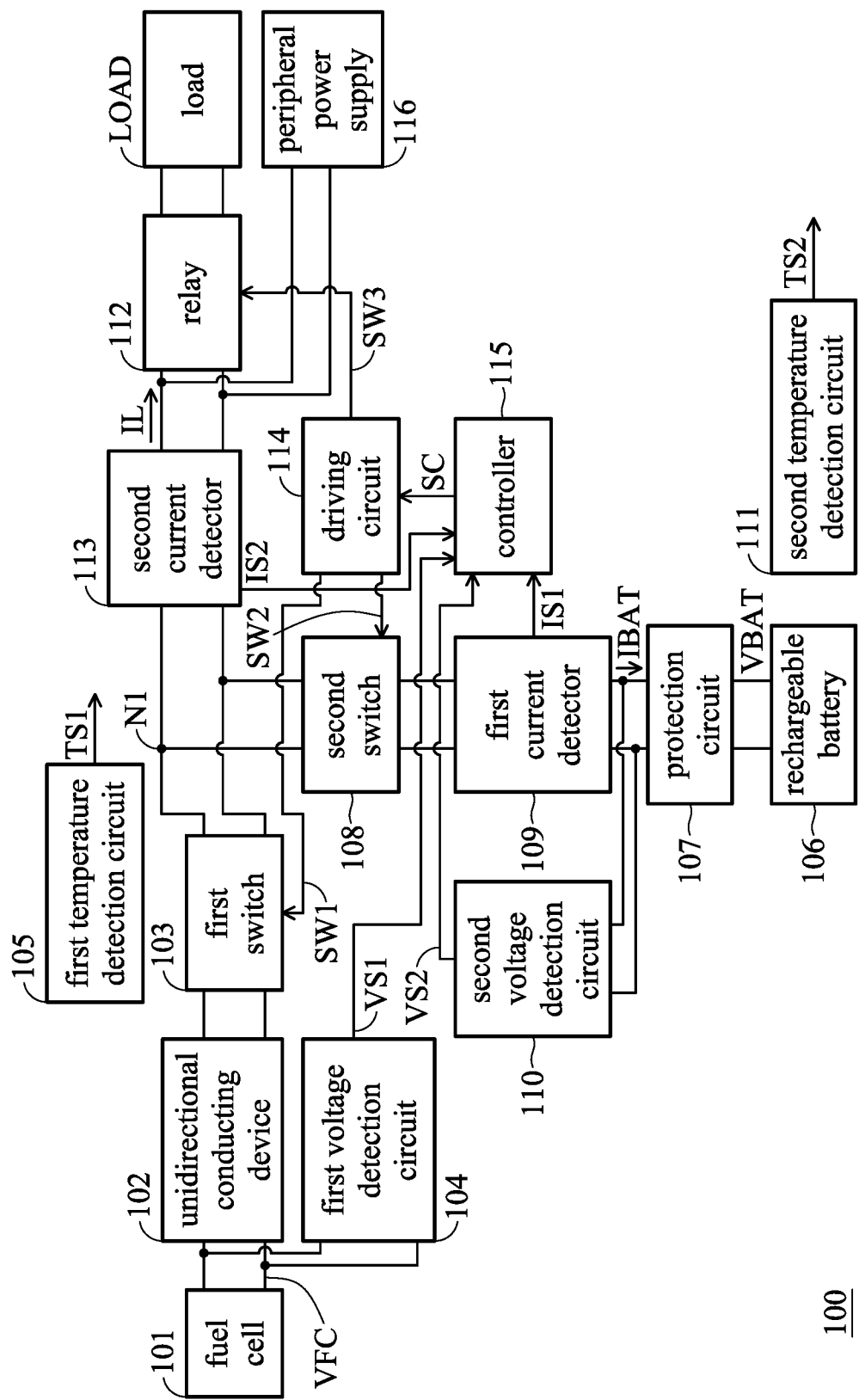
FIG. 1 is a schematic diagram illustrating an electronic device in accordance with an embodiment of the present invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It would be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It is understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a schematic diagram of an electronic device in accordance with an embodiment of the present invention. As shown in FIG. 1, the electronic device 100 includes a fuel cell 101, a unidirectional conducting device 102, a first switch 103, a first voltage detection circuit 104, and a first temperature detection circuit 105.

The fuel cell 101 provides the fuel voltage VFC, and the unidirectional conducting device 102 is configured to unidirectionally provide the fuel voltage VFC to the first switch 103. According to an embodiment of the present invention, the unidirectional conducting device 102 is a diode. According to another embodiment of the present invention, the unidirectional conducting device 102 is a Schottky diode.

The first switch 103 is coupled between the fuel cell 101 and the first node N1 and is turned on and off according to the first control signal SW1. According to an embodiment of the present invention, the first switch 103 is a metal oxide semiconductor.

The first voltage detection circuit 104 is configured to detect the fuel voltage VFC to generate a first voltage detection signal VS1. The first temperature detection circuit 105 is configured to detect the temperature of the first switch 103 to generate a first temperature detection signal TS1.

As shown in FIG. 1, the electronic device 100 further includes a rechargeable battery 106, a second switch 108, a first current detector 109, a second voltage detection circuit 110, and a second temperature detection circuit 111.

The rechargeable battery 106 provides the battery voltage VBAT. According to some embodiments of the present invention, the rechargeable battery 106 may be a lead-acid battery, a nickel-metal hydride (Ni-MH) battery, a lithium-ion (Li-ion) battery, a lithium-ion polymer (Li—Po) battery, a Lithium-ion Polymer High-Voltage (Li-HV) battery, a Lithium Iron Phosphate (Li—Fe) battery and any other reusable battery.

According to an embodiment of the present invention, when the rechargeable battery 106 is a lithium ion (Li-ion) battery, a lithium polymer (Li—Po) battery, a Lithium-ion Polymer High-Voltage (Li-HV) battery or a lithium iron phosphate (Li—Fe) battery, the electronic device 100 may further include a protection circuit 107 for protecting the voltage of each battery cell of the rechargeable battery 106 from exceeding the threshold voltage, and making the voltages of the battery cells are close to one another.

According to an embodiment of the present invention, when the rechargeable battery 106 includes a multiple of lithium ion battery cells or a multiple of lithium ion polymer battery cells in series, the protection circuit 107 is configured to prevent the voltage of each battery cell from exceeding 4.2V. According to another embodiment of the present invention, when the rechargeable battery 106 includes a multiple of high-voltage lithium-ion polymer (Li-HV) battery cells in series, the protection circuit 107 is configured to prevent the voltage of each battery cell from exceeding 4.35V. According to another embodiment of the present invention, when the rechargeable battery 106 includes a multiple of lithium iron phosphate battery cells in series, the protection circuit 107 is configured to prevent the voltage of each battery cell from exceeding 3.65V.

The second switch 108 is coupled between the first node N1 and the rechargeable battery 106, and charges the rechargeable battery 106 with the voltage of the first node N1 according to the second control signal SW2. According to an embodiment of the present invention, the second switch 108 is an insulated gate bipolar transistor (IGBT). According to an embodiment of the present invention, the rechargeable battery 106 discharges to the load LOAD through a diode (not shown in FIG. 1) added by the second switch 108.

The first current detector 109 is coupled between the rechargeable battery 106 and the second switch 108 for measuring the battery current IBAT to generate the first current detection signal IS1. According to some embodiments of the invention, the battery current IBAT includes a charging current for charging the rechargeable battery 106 and a discharging current that the rechargeable battery 106 discharges.

The second voltage detection circuit 110 is configured to detect the battery voltage VBAT of the rechargeable battery 106 to generate a second voltage detection signal VS2. The second temperature detection circuit 111 is configured to detect the temperature of the rechargeable battery 106 to generate a second temperature detection signal TS2.

As shown in FIG. 1, the electronic device 100 further includes a relay 112, a second current detector 113, a driving circuit 114, a controller 115, and a peripheral power supply 116. The relay 112 is coupled between the first node N1 and the load LOAD, and provides the voltage of the first node N1 to the load LOAD according to the third control signal SW3.

The second current detector 113 is coupled between the first node N1 and the relay 112 for measuring the load current IL flowing to the load LOAD to generate the second current detection signal IS2. According to an embodiment of the present invention, the second current detector 113 is configured to detect the total output current of the fuel cell 101 and the rechargeable battery 106. According to some embodiments of the present invention, the first current detector 109 and the second current detector 113 are Hall detectors.

The driving circuit 114 generates the first control signal SW1, the second control signal SW2, and the third control signal SW3 according to the driving signal SC, and then controls the first switch 103, the second switch 108, and the relay 112 to be turned on and off. The controller 115 generates the drive signal SC according to the first temperature detection signal TS1, the second temperature detection signal TS2, the first current detection signal IS1, the second current detection signal IS2, the first voltage detection signal VS1, and the second voltage detection signal VS2. The driving circuit 114 and the controller 115 will be described thoroughly in the following paragraphs.

The peripheral power supply 116 is coupled to the first node N1 and configured to power the electronic device 100. As shown in FIG. 1, the relay 112 is coupled behind the peripheral power source 116, and the second current detector 113 detects the sum of the current flowing to the load LOAD and the current flowing to the peripheral power source 116.

Figure 2:
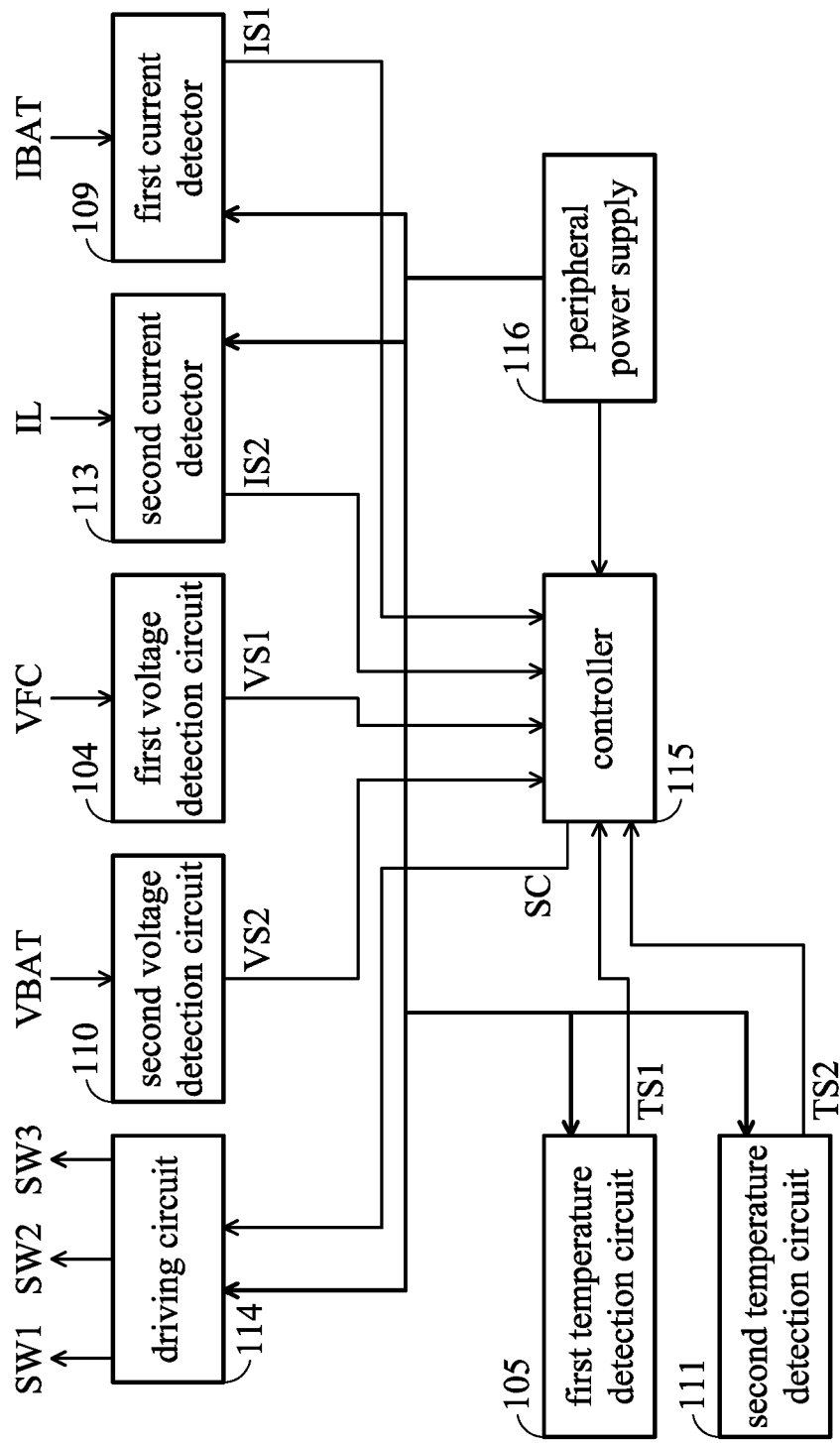
FIG. 2 is a schematic diagram illustrating the operation of the controller and the driving circuit of the electronic device in accordance with an embodiment of the present invention.

FIG. 2 is a schematic diagram illustrating the operation of a controller and a driving circuit of an electronic device in accordance with an embodiment of the present invention. As shown in FIG. 2, the peripheral power supply 116 powers the first temperature detection circuit 105, the first current detector 109, the second temperature detection circuit 111, the second current detector 113, the driving circuit 114, and the controller 115.

According to some embodiments of the present invention, the peripheral power supply 116 supplies a supply voltage to the first temperature detection circuit 105, the first current detector 109, the second temperature detection circuit 111, the second current detector 113, the drive circuit 114, and the controller 115.

According to other embodiments of the present invention, when the fuel cell 101 reacts to generate the fuel voltage VFC, auxiliary circuits (not shown in FIG. 1 and FIG. 2) are required to assist the fuel cell 101 to react efficiently, and these auxiliary circuits are powered by the peripheral power supply 116.

In addition, the controller 115 receives the first voltage detection signal VS1 generated by the first voltage detection circuit 104, the first temperature detection signal TS1 generated by the first temperature detection circuit 105, and the first current detection signal IS1 generated by the device 109, the second voltage detection signal VS2 generated by the second voltage detection circuit 110, the second temperature detection signal TS2 generated by the second temperature detection circuit 111, and the second temperature detection signal TS2 generated by the second temperature detection circuit 111, and the second current detection signal IS2 generated by the two current detectors 113 to generate the driving signal SC. The driving circuit 114 drives the first switch 103, the second switch 108 and the relay 112 by using the first control signal SW1, the second control signal SW2, and the third control signal SW3 respectively according to the driving signal SC.

As shown in FIG. 1, since the response time of the steady-state voltage of the fuel cell 101 is relatively slow and the instantaneous current driving capability is relatively insufficient, the electronic device 100 further includes a rechargeable battery 106 to supplement the poor current driving capability of the fuel cell 101. According to other embodiments of the present invention, when the rechargeable battery 106 is not any one of a lithium ion (Li-ion) battery, a lithium ion polymer (Li—Po) battery, a high-voltage lithium ion polymer battery (Li-HV), and a lithium iron phosphate (Li—Fe) battery, the electronic device 100 may omit the protection circuit 107 to reduce the cost.

Figure 3:
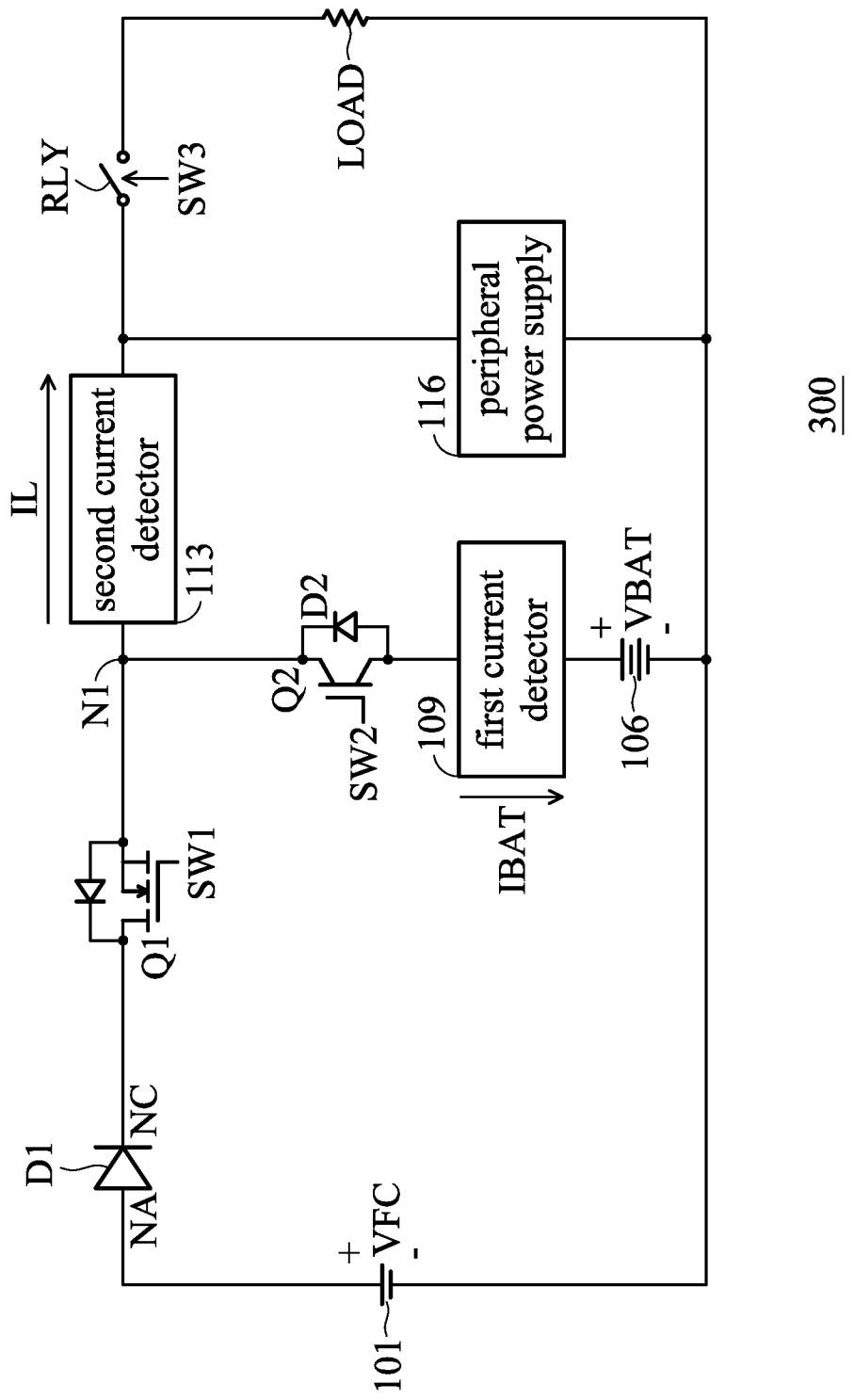
FIG. 3 is a schematic diagram illustrating an electronic device in accordance with another embodiment of the present invention.

FIG. 3 is a schematic diagram of an electronic device in accordance with another embodiment of the present invention. Comparing the electronic device 300 of FIG. 3 with the electronic device 100 of FIG. 1, the unidirectional conducting device 102 of FIG. 1 is replaced with a diode D1, and the second switch 108 further includes an additional diode D2.

According to some embodiments of the present invention, the rechargeable battery 106 powers the load LOAD through the second switch 108 and the additional diode D2.

As shown in FIG. 3, the diode D1 includes an anode terminal NA and a cathode terminal NC, in which the anode terminal NA is coupled to the fuel cell 101, and the cathode terminal NC is coupled to the first switch 103. According to another embodiment of the present invention, the diode D1 may be a Schottky diode for further reducing the power loss caused by the voltage across the diode.

Figure 4:
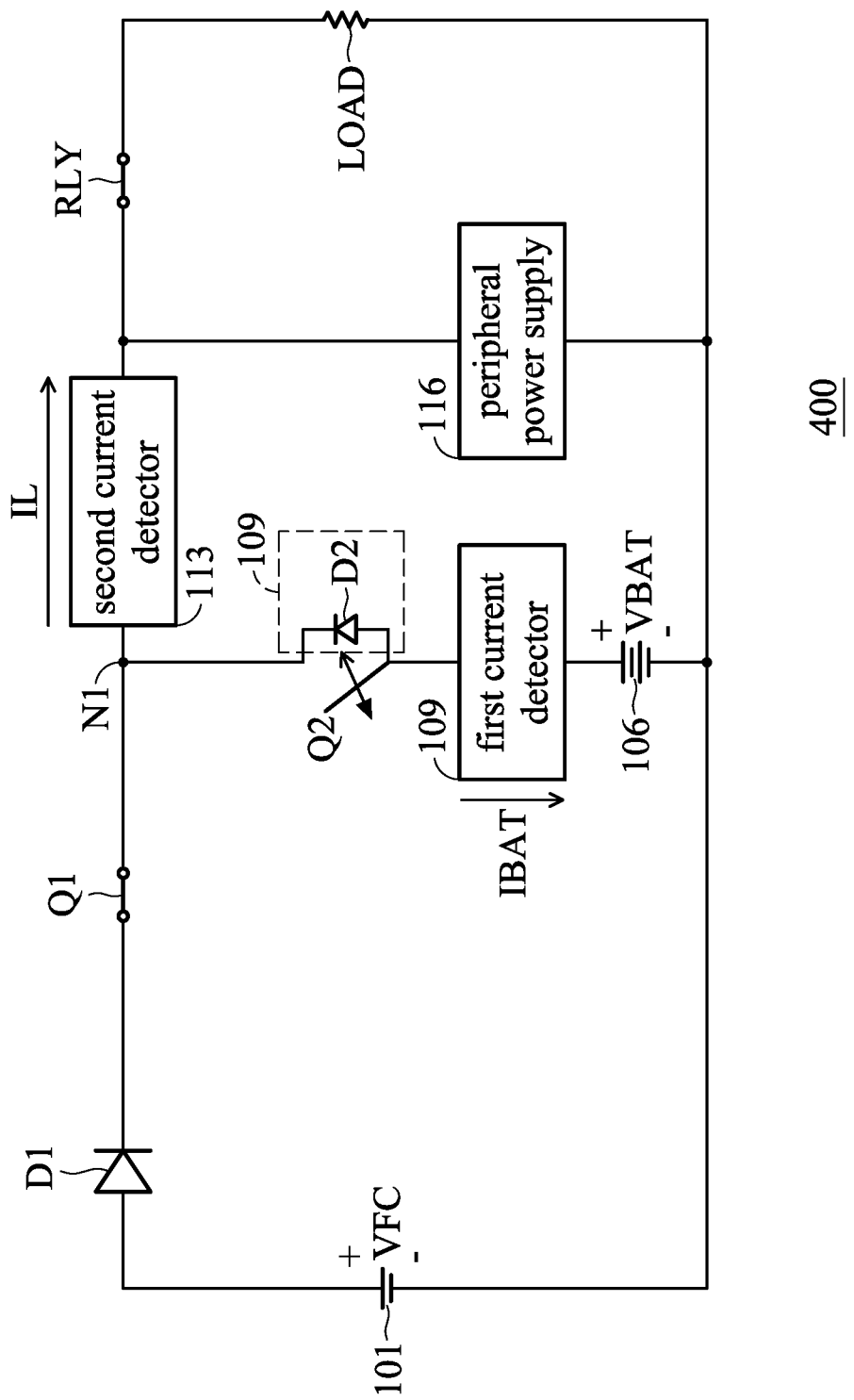
FIG. 4 is a schematic diagram illustrating an electronic device operating in a first mode in accordance with an embodiment of the present invention.

FIG. 4 is a schematic diagram illustrating an electronic device operating in a first mode in accordance with an embodiment of the present invention. As shown in FIG. 4, when the controller 115 determines that the fuel voltage VFC of the electronic device 400 is greater than the battery voltage VBAT and the charging current of the rechargeable battery 106 exceeds the maximum charging current IP, the controller 115 operates in the first mode to generate the drive signal SC, and the driving circuit 114 turns on the first switch 103 and the relay 112 according to the driving signal SC and turns on the second switch 108 periodically, so that the average charging current charging the rechargeable battery 106 is the maximum charging current IP.

According to an embodiment of the present invention, the controller 115 samples the battery current IBAT N times within the first period T1, and averages it to generate the average current IAVE, where the average current IAVE is shown in Eq. 1:

$$IAVE = \frac{\sum_{k=1}^{N} i_k}{N} \quad \text{(Eq. 1)}$$

According to an embodiment of the present invention, when the average current IAVE is not greater than the maximum charging current IP, it indicates that the rechargeable battery 106 can be safely charged by the second switch 108 being continuously turned on. Therefore, the second switch 108 is continuously turned on to safely and continuously charge the rechargeable battery 106.

According to another embodiment of the present invention, when the average current IAVE exceeds the maximum charging current IP, in order to make the charging current per unit period not exceed the maximum charging current IP, the conduction period ratio DON of the second switch 108 is shown as Eq. 2:

$$DON = \frac{IP}{IAVE} \quad \text{(Eq. 2)}$$

In other words, when the average current IAVE exceeds the maximum charging current IP, the second switch 108 can only be turned on for the duty cycle DON during the first period T1 (i.e., T1×DON), and the second switch 108 is turned off during the rest of the first period T1 (i.e., T1×(1-DON)), so that the average charging current charging the rechargeable battery 106 does not exceed the maximum charging current IP.

Figure 5:
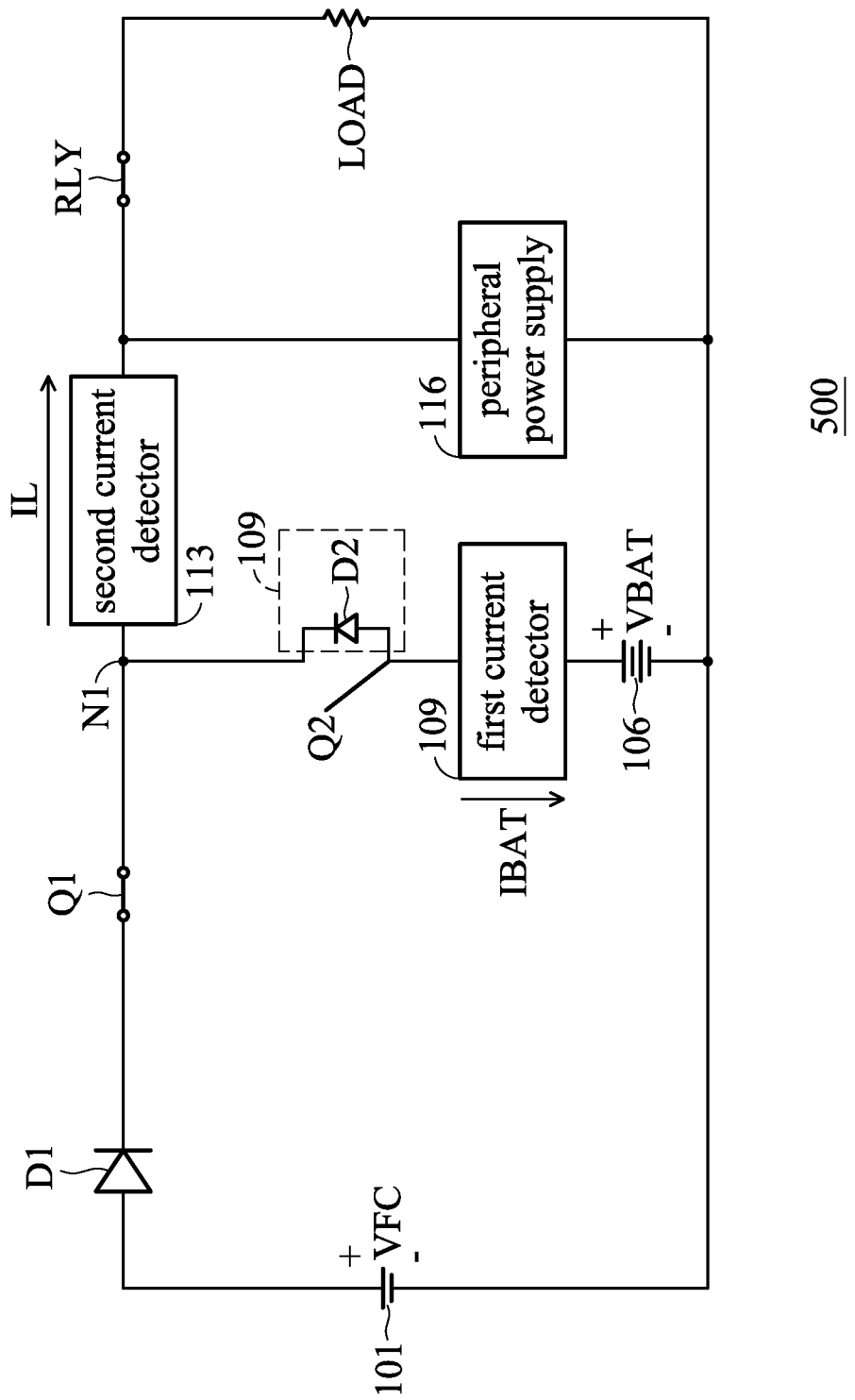
FIG. 5 is a schematic diagram illustrating the electronic device operating in the second mode in accordance with an embodiment of the present invention.

FIG. 5 is a schematic diagram illustrating an electronic device operating in a second mode in accordance with an embodiment of the present invention. As shown in FIG. 5, when the controller 115 determines that the fuel voltage VFC of the electronic device 500 exceeds the battery voltage VBAT and the battery voltage VBAT exceeds a threshold voltage, it indicates that the rechargeable battery 106 has sufficient power, and the controller 115 operates in the second mode to generate the driving signal SC, and the driving circuit 114 turns on the first switch 103 and the relay 112 and turns off the second switch 108 according to the driving signal SC.

When the driving circuit 114 does not turn on the second switch 108, the fuel voltage VFC of the fuel cell 101 directly supplies power to the load LOAD, and the rechargeable battery 106 may supply power to the load LOAD through the second switch 108 and the additional diode D2. Since the second switch 108 is turned off, the fuel cell 101 does not charge the rechargeable battery 106.

Figure 6:
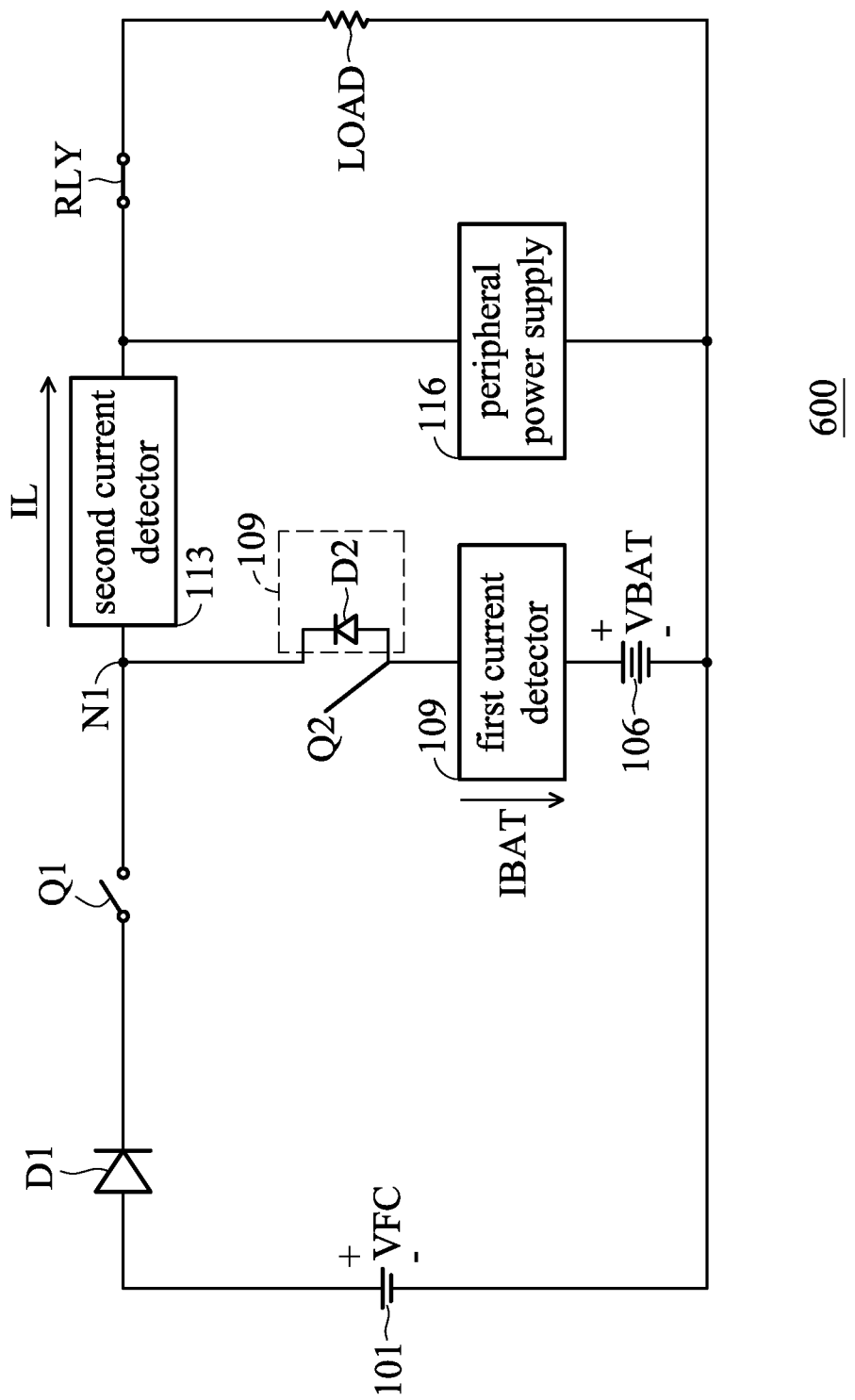
FIG. 6 is a schematic diagram illustrating the electronic device operating in a third mode in accordance with an embodiment of the present invention.

FIG. 6 is a schematic diagram illustrating an electronic device operating in a third mode in accordance with an embodiment of the present invention. As shown in FIG. 6, when the controller 115 determines that the fuel voltage VFC of the electronic device 600 is lower than the battery voltage VBAT, the controller 115 operates in the third mode to generate the drive signal SC, and the drive circuit 114 turns on the relay 112 and turns off the first switch 103 and the second switch 108 according to the driving signal SC. The relay 112 is turned on, and the first switch 103 and the second switch 108 are not turned on. Therefore, the battery voltage VBAT of the rechargeable battery 106 supplies power to the load LOAD through the second switch 108 and the additional diode D2.

Figure 7:
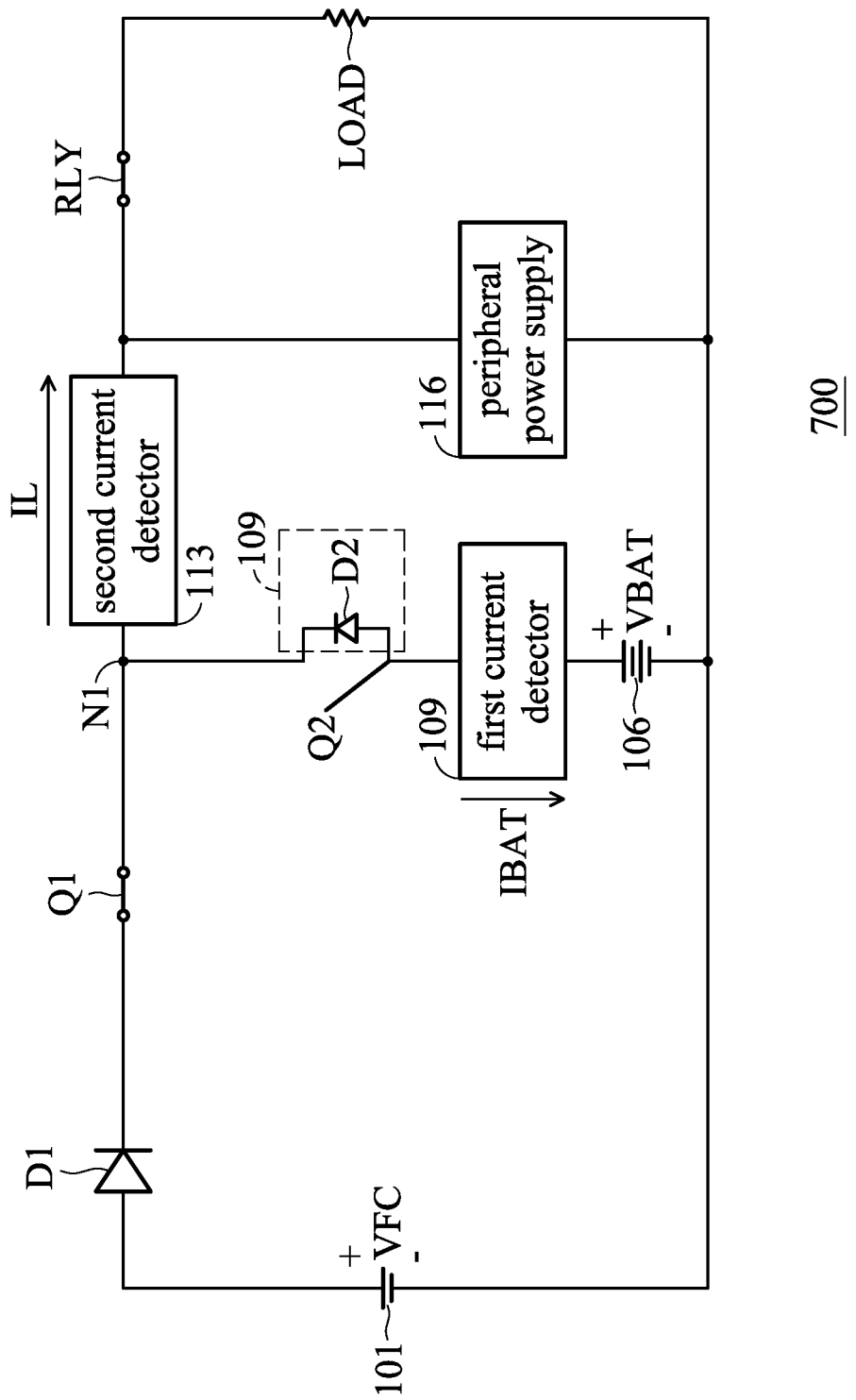
FIG. 7 is a schematic diagram illustrating the electronic device operating in a fourth mode in accordance with an embodiment of the present invention.

FIG. 7 is a schematic diagram illustrating an electronic device operating in a fourth mode in accordance with an embodiment of the present invention. As shown in FIG. 7, when the controller 115 determines that the fuel voltage VFC of the electronic device 700 is equal to the battery voltage VBAT, the controller 115 operates in the fourth mode to generate the driving signal SC, and the driving circuit 114 turns on the first switch 103 and the relay 112 and turns off the second switch 108 according to the driving signal SC.

Since the first switch 103 is turned on, the fuel voltage VFC of the fuel cell 101 supplies power to the load LOAD. In addition, the battery voltage VBAT of the rechargeable battery 106 supplies power to the load LOAD through the second switch 108 and the additional diode D2.

Figure 8:
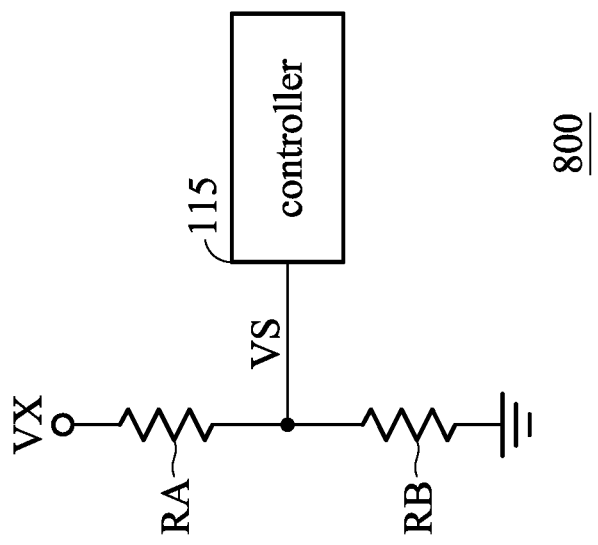
FIG. 8 is a circuit diagram illustrating a voltage detection circuit in accordance with an embodiment of the present invention.

FIG. 8 is a circuit diagram of a voltage detection circuit in accordance with an embodiment of the present invention. As shown in FIG. 8, the voltage detection circuit 800 includes a first resistor RA and a second resistor RB, in which the voltage detection circuit 800 divides the to-be-measured voltage VX by the first resistor RA and the second resistor RB to generate a voltage detection signal VS and provides the voltage detection signal VS to the controller 115.

According to an embodiment of the present invention, the voltage detection circuit 800 corresponds to the first voltage detection circuit 104 in FIG. 1 for detecting the fuel voltage VFC of the fuel cell 101 to generate the first voltage detection signal VS1. According to another embodiment of the present invention, the voltage detection circuit 800, which corresponds to the second voltage detection circuit 110 of FIG. 1, is configured to detect the battery voltage VBAT of the rechargeable battery 106 to generate the second voltage detection signal VS2.

Figure 9:
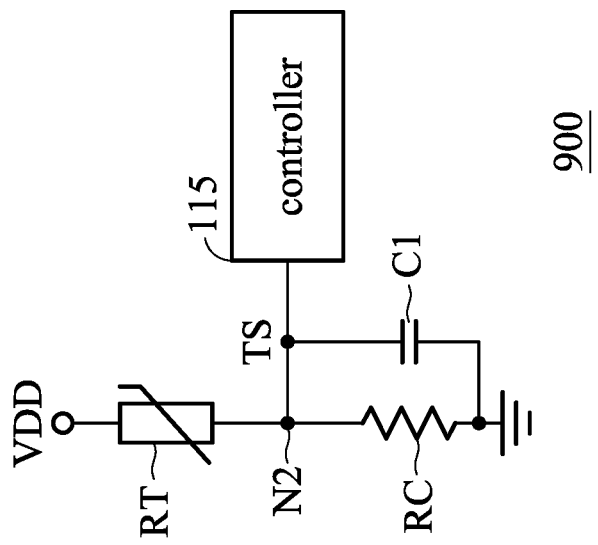
FIG. 9 is a circuit diagram illustrating a temperature detection circuit in accordance with an embodiment of the present invention.

FIG. 9 is a circuit diagram illustrating a temperature detection circuit in accordance with an embodiment of the present invention. As shown in FIG. 9, the temperature detection circuit 900 includes a thermistor RT, a third resistor RC, and a first capacitor C1. The thermistor RT is coupled between the supply voltage VDD and the second node N2, the third resistor RC is coupled between the second node N2 and the ground, and the first capacitor C1 is coupled between the second node N2 and the ground. According to an embodiment of the present invention, the thermistor RT has a negative temperature coefficient. In other words, the resistance value of the thermistor RT decreases as the temperature increases.

According to an embodiment of the present invention, since the resistance value of the thermistor RT varies with temperature, and the supply voltage VDD is divided by the thermistor RT and the third resistor RC to generate a temperature detection at the second node N2, the controller 115 may infer the ambient temperature according to the voltage value of the temperature detection signal TS. According to an embodiment of the present invention, the supply voltage VDD is provided by the peripheral power supply 116 in FIG. 1. According to an embodiment of the present invention, the first capacitor C1 is configured to stabilize the voltage value of the temperature detection signal TS.

According to an embodiment of the present invention, the temperature detection circuit 900, which corresponds to the first temperature detection circuit 105 in FIG. 1, is configured to detect the temperature of the first switch 103 to generate the first temperature detection signal TS1. According to another embodiment of the present invention, the temperature detection circuit 900, which corresponds to the second temperature detection circuit 111 in FIG. 1, is configured to detect the temperature of the rechargeable battery 106.

Figure 10:
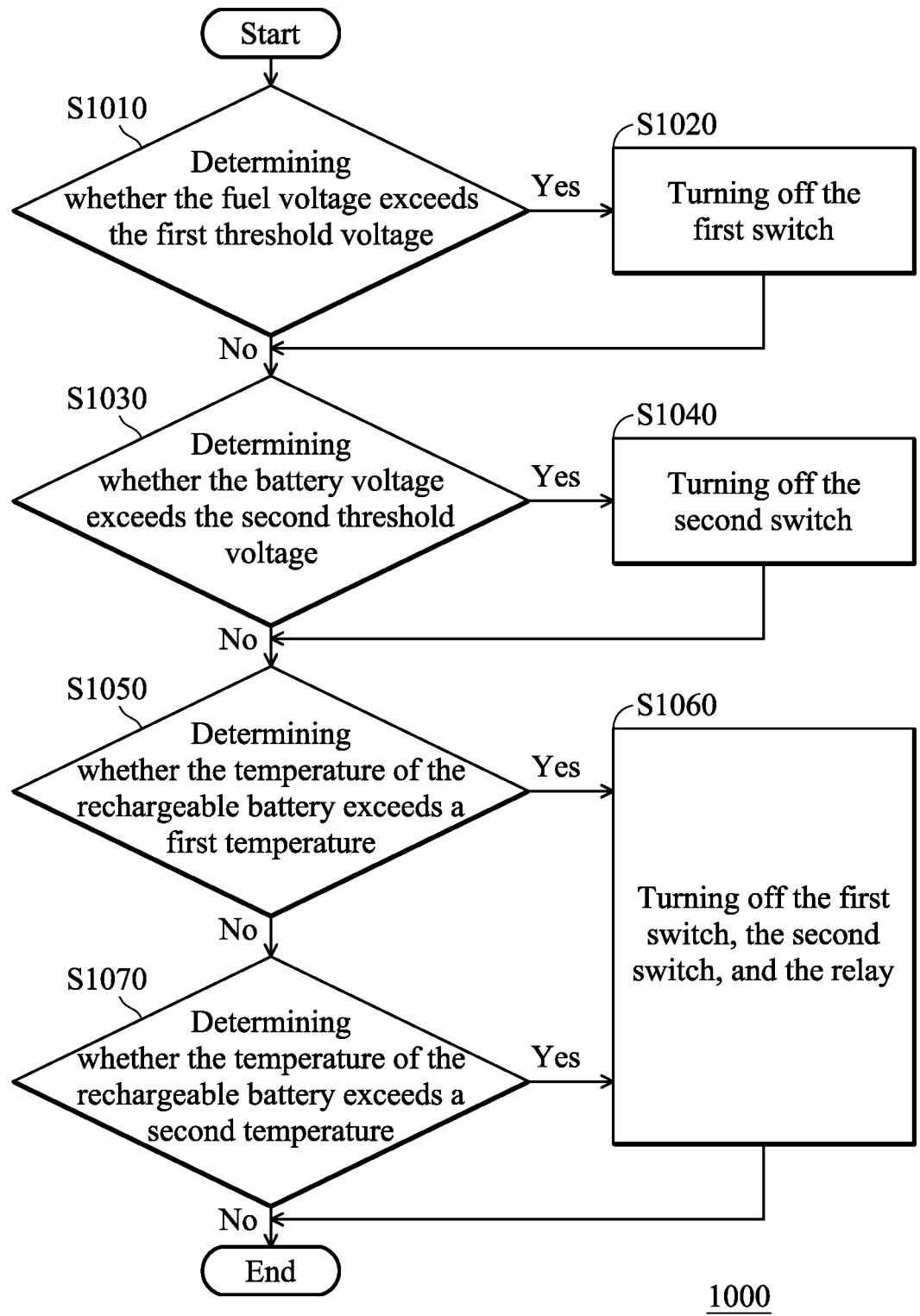
FIG. 10 is a flow chart illustrating a protection method in accordance with an embodiment of the present invention.

FIG. 10 is a flow chart illustrating a protection method in accordance with an embodiment of the present invention. The following description of the protection method 1000 in FIG. 10 will be companied with the electronic device 100 in FIG. 1 to facilitate detailed description.

First, the controller 115 determines whether the fuel voltage VFC exceeds the first threshold voltage according to the first voltage detection signal VS1 generated by the first voltage detection circuit 104 (Step S1010). When it is determined that the fuel voltage VFC exceeds the first threshold voltage, the controller 115 controls the driving circuit 114 to turn off the first switch 103 by using the driving signal SC (Step S1020).

According to an embodiment of the present invention, when the fuel voltage VFC exceeds the first threshold voltage, the excessively high fuel voltage VFC may burn out the load LOAD and/or the rechargeable battery 106. In order to protect the load LOAD and the rechargeable battery 106, it is necessary to disconnect the fuel cell 101 by using the first switch 103 in the first place.

Returning to Step S1010, when it is determined that the fuel voltage VFC does not exceed the first threshold voltage, the controller 115 determines whether the battery voltage VBAT of the rechargeable battery 106 exceeds the second threshold voltage according to the second voltage detection signal VS2 generated by the second voltage detection circuit 110 (Step S1030). When it is determined that the battery voltage VBAT exceeds the second threshold voltage, the controller 115 controls the driving circuit 114 to turn off the second switch 108 by using the driving signal SC (Step S1040).

According to an embodiment of the present invention, when the battery voltage VBAT exceeds the second threshold voltage, it indicates that the rechargeable battery 106 is fully charged or close to being fully charged. In order to protect the rechargeable battery 106, the second switch 108 may be turned off to prevent the rechargeable battery from being overcharged. However, the rechargeable battery 106 may still supply power to the load LOAD through the additional diode of the second switch 108 (D2 as shown in FIG. 3).

Returning to step S1030, when it is determined that the battery voltage VBAT does not exceed the second threshold voltage, the controller 115 determines whether the temperature of the rechargeable battery 106 exceeds the first temperature according to the second temperature detection signal TS2 generated by the second temperature detection circuit 111. (Step S1050). When it is determined that the temperature of the rechargeable battery 106 exceeds the first temperature, the controller 115 controls the driving circuit 114 to turn off the first switch 106, the second switch 108, and the relay 112 by using the driving signal SC (Step S1060).

When it is determined that the temperature of the rechargeable battery 106 does not exceed the first temperature, the controller 115 determines whether the temperature of the first switch 103 exceeds the second temperature according to the first temperature detection signal TS1 generated by the first temperature detection circuit 105 (Step S1070). When it is determined that the temperature of the first switch 103 exceeds the second temperature, the controller 115 controls the driving circuit 114 to turn off the first switch 106, the second switch 108, and the relay 112 by using the driving signal SC (Step S1060).

When it is determined that the temperature of the first switch 103 does not exceed the second temperature, the controller 115 ends the protection method 1000. According to some embodiments of the present invention, the controller 115 executes the protection method 1000 every predetermined period to ensure that the electronic device 100 operates normally.

According to an embodiment of the present invention, since the high temperature will reduce the life of the rechargeable battery 106 and the high temperature is often caused by the abnormal operation of the rechargeable battery 106, when the temperature of the rechargeable battery 106 exceeds the first temperature, the power is stopped supplying to the load LOAD to avoid danger. According to an embodiment of the present invention, since the first switch 106 is the device in the electronic device 100 that operates for a longer time, in order to protect the first switch 106, the temperature of the first switch 106 must be continuously monitored to prevent the first switch 106 from being damaged by high temperature.

Figure 11:
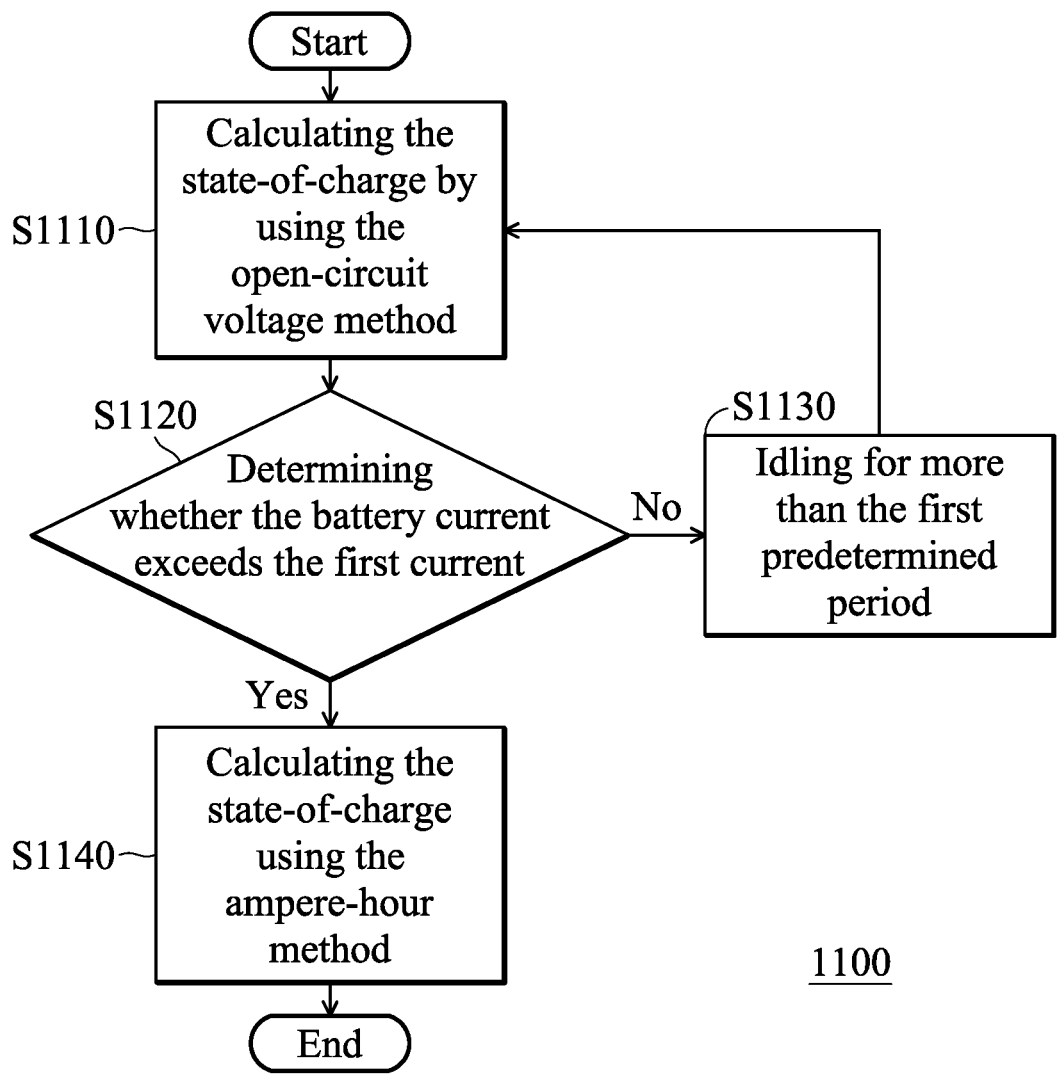
FIG. 11 is a flow chart illustrating a state-of-charge calculation method in accordance with an embodiment of the present invention.

FIG. 11 is a flow chart illustrating a state-of-charge calculation method in accordance with an embodiment of the present invention. The following description of the state-of-charge calculation method 1100 in FIG. 11 will be combined with the electronic device 100 in FIG. 1 to facilitate detailed description.

First, when the electronic device 100 is initialized and the relay 112 is turned off, the controller 115 determines the battery voltage VBAT of the rechargeable battery 106 according to the second voltage detection signal VS2 generated by the second voltage detection circuit 110, and calculates the state-of-charge of the rechargeable battery 106 according to the battery voltage VBAT by using the open-circuit voltage method (step S1110).

According to one embodiment of the present invention, the controller 115 has a look-up table. When the controller 115 obtains the battery voltage VBAT during the relay 112 being off, the controller 115 retrieves the lookup table for the state-of-charge corresponding to the battery voltage VBAT as the state-of-charge of the rechargeable battery 106. Different type of the rechargeable battery 106 corresponds to different lookup table.

Next, the controller 115 determines whether the battery current IBAT exceeds the first current according to the first current detection signal IS1 generated by the first current detector 109 (Step S1120). According to an embodiment of the present invention, the battery current IBAT represents the charging current and the discharging current of the rechargeable battery 106.

When it is determined that the battery current IBAT does not exceed the first current and lasts for more than the first predetermined period (Step S1130), the controller 115 calculates the state-of-charge of the rechargeable battery 106 using the open circuit voltage method again (Step S1110). According to some embodiments of the present invention, the first predetermined period is 30 minutes.

When it is determined that the battery current IBAT exceeds the first current, the controller 115 calculates the state-of-charge using the ampere-hour method (Step S1140). According to some embodiments of the present invention, the first current is 1 amp. According to some embodiments of the present invention, the controller 115 obtains an initial value of the state-of-charge of the rechargeable battery 106 by using the open-circuit voltage method. When the battery current IBAT is large enough (i.e., the charge current and/or discharge current of the rechargeable battery 106 exceeds the first current), the controller 115 takes the initial value of the state-of-charge obtained by the open-circuit voltage method and utilizes the ampere-hour method to calculate the state-of-charge of the rechargeable battery 106 after charging and/or discharging.

A fuel cell combined with a rechargeable battery is provided herein. The rechargeable battery may make up for the issue of insufficient current driving capability of the fuel cell, and the fuel cell may continuously supplement the power of the rechargeable battery to improve the endurance. A protection method and a state-of-charge calculation method are also provided herein, which help to ensure the normal operation of the fuel cell combined with the rechargeable battery and provide the user with reliable information about the power level of the rechargeable battery, so as to improve user experience.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An electronic device, comprising:
   a fuel cell, providing a fuel voltage;
   a first switch, providing the fuel voltage to a first node according to a first control signal;
   a rechargeable battery, providing a battery voltage;
   a second switch, coupled to the first node, wherein the second switch charges the rechargeable battery with the fuel voltage according to a second control signal;
   a relay, providing a voltage of the first node to a load according to a third control signal;
   a first current detector, coupled between the second switch and the rechargeable battery and configured to detect a battery current of the rechargeable battery to generate a first current signal;
   a second current detector, coupled between the first node and the relay and configured to detect a load current flowing to the load to generate a second current signal;
   a first voltage detection circuit, configured to detect the fuel voltage to generate a first voltage detection signal;
   a second voltage detection circuit, configured to detect the battery voltage to generate a second voltage detection signal;
   a driving circuit, generating the first control signal, the second control signal, and the third control signal according to a driving signal; and
   a controller, generating the driving signal according to the first current signal, the second current signal, the first voltage detection signal, and the second voltage detection signal.

2. The electronic device as defined in claim 1, further comprising:
   a unidirectional conducting device, coupled between the fuel cell and the first switch and configured to unidirectionally provide the fuel voltage to the first switch.

3. The electronic device as defined in claim 2, wherein the unidirectional conducting device comprises:
   a diode, comprising an anode and a cathode, wherein the anode is coupled to the fuel cell, and the cathode is coupled to the first switch.

4. The electronic device as defined in claim 3, wherein the diode is a Schottky diode.

5. The electronic device as defined in claim 1, wherein the first switch is a metal oxide semiconductor.

6. The electronic device as defined in claim 1, wherein the second switch is an insulated gate bipolar transistor.

7. The electronic device as defined in claim 1, wherein each of the first current detector and the second current detector is a Hall detector.

8. The electronic device as defined in claim 1, further comprising:
   a peripheral power supply, configured to power the first voltage detection circuit, the second voltage detection circuit, the first current detector, the second current detector, the driving circuit, and the controller.

9. The electronic device as defined in claim 1, wherein the rechargeable battery comprises a multiple of lithium battery cells, wherein the electronic device further comprises:
   a protection circuit, configured to prevent voltages of the lithium battery cells from exceeding a second threshold voltage.

10. The electronic device as defined in claim 9, wherein the protection circuit further comprises:
    a first temperature detection circuit, configured to detect a temperature of the first switch to generate a first temperature detection signal, wherein the first temperature detection circuit provides the first temperature detection signal to the controller.

11. The electronic device as defined in claim 10, wherein when the controller determines that the temperature of the first switch exceeds a first temperature according to the first temperature detection signal, the driving circuit turns off the first switch, the second switch, and the relay.

12. The electronic device as defined in claim 10, wherein the protection circuit further comprises:
  a second temperature detection circuit, configured to detect a temperature of the rechargeable battery to generate a second temperature detection signal, wherein the second temperature detection circuit provides the second temperature detection signal to the controller.

13. The electronic device as defined in claim 12, wherein when the controller determines that the temperature of the rechargeable battery exceeds a second temperature according to the second temperature detection signal, the driving circuit turns off the first switch, the second switch, and the relay.

14. The electronic device as defined in claim 12, wherein each of the first temperature detection circuit and the second temperature detection circuit further comprises:
  a negative temperature coefficient resistor, coupled between a supply voltage and a second node;
  a first resistor, coupled between the second node and a ground; and
  a first capacitor, coupled between the second node and the ground, wherein the temperature detection signal is generated at the second node.

15. The electronic device as defined in claim 14, wherein a peripheral power supply provides the supply voltage.

16. The electronic device as defined in claim 1, wherein when the controller determines that the fuel voltage exceeds a first threshold voltage according to the first voltage detection signal, the driving circuit turns off the first switch.

17. The electronic device as defined in claim 1, wherein when the controller determines that the battery voltage exceeds a second threshold voltage according to the second voltage detection signal, the driving circuit turns off the second switch.

* * * * *